US009884608B1

(12) United States Patent
Roychoudhury

(10) Patent No.: US 9,884,608 B1
(45) Date of Patent: Feb. 6, 2018

(54) FOUR AND SIX-POINT SEAT BELT SYSTEMS

(71) Applicant: Ford Global Technologies, LLC, Dearborn, MI (US)

(72) Inventor: Raj S. Roychoudhury, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 21 days.

(21) Appl. No.: 15/215,163

(22) Filed: Jul. 20, 2016

(51) Int. Cl.
- B60R 22/00 (2006.01)
- B60R 22/34 (2006.01)
- B60R 22/02 (2006.01)

(52) U.S. Cl.
CPC ........... B60R 22/34 (2013.01); B60R 22/02 (2013.01); B60R 22/00 (2013.01); B60R 2022/027 (2013.01)

(58) Field of Classification Search
CPC ......... B60R 22/00; B60R 22/34; B60R 22/02; B60R 2022/027
See application file for complete search history.

(56) References Cited

U.S. PATENT DOCUMENTS

| | | | | |
|---|---|---|---|---|
| 3,887,233 A * | 6/1975 | Garavaglia | ............ | B60R 22/26 297/478 |
| 5,676,398 A * | 10/1997 | Nurtsch | ............ | B60R 22/02 180/219 |
| 6,076,894 A * | 6/2000 | Busch | ............ | B60R 22/26 297/475 |
| 6,237,945 B1 | 5/2001 | Aboud et al. | | |
| 6,309,024 B1 * | 10/2001 | Busch | ............ | B60R 22/00 24/170 |
| 6,869,105 B2 * | 3/2005 | Cheng | ............ | B60R 22/06 280/804 |
| 6,871,876 B2 * | 3/2005 | Xu | ............ | A44B 11/2549 280/801.1 |
| 8,016,318 B2 * | 9/2011 | Nezaki | ............ | B60N 2/002 280/733 |
| 9,302,644 B2 * | 4/2016 | Rouhana | ............ | B60R 22/02 |

(Continued)

FOREIGN PATENT DOCUMENTS

| | | |
|---|---|---|
| CN | 203727327 U | 7/2014 |
| DE | 3231898 A1 | 3/1984 |

(Continued)

OTHER PUBLICATIONS

UKIPO Search Report for Application No. GB1711484.4 dated Dec. 7, 2017 (3 pages).

*Primary Examiner* — Philip F Gabler
(74) *Attorney, Agent, or Firm* — Frank A. MacKenzie; Bejin Bieneman PLC

(57) ABSTRACT

A seat belt assembly includes a first lap belt portion having an anchored end and a first plate, and a second lap belt portion having an anchored end and a second plate. A first shoulder belt having a retractor end and a buckle end extends through a first slot in the first plate between the retractor end and the buckle end. A second shoulder belt having a retractor end and a tongue end extends through a first slot in the second plate between the retractor end and the tongue end. The buckle end is fixedly attached to a buckle and the tongue end is fixedly attached to a tongue. The buckle and the tongue are releasably attachable.

20 Claims, 6 Drawing Sheets

(56) References Cited

U.S. PATENT DOCUMENTS

| | | |
|---|---|---|
| 2002/0135175 A1 | 9/2002 | Schroth |
| 2005/0206152 A1* | 9/2005 | Delventhal ....... B60R 21/01516 |
| | | 280/805 |
| 2010/0164215 A1* | 7/2010 | Nezaki .................... B60R 21/18 |
| | | 280/808 |
| 2014/0138942 A1 | 5/2014 | Rouhana |
| 2015/0307061 A1* | 10/2015 | Chekaev ................. B60R 22/26 |
| | | 297/483 |
| 2017/0129451 A1* | 5/2017 | Bittner .................... B60R 22/34 |

FOREIGN PATENT DOCUMENTS

| | | |
|---|---|---|
| DE | 102008004957 A1 | 7/2009 |
| DE | 102010015443 A1 | 10/2011 |
| EP | 1069008 A1 | 1/2001 |
| GB | 1572630 A | 7/1980 |
| JP | 2010195237 A | 9/2010 |

\* cited by examiner

FOUR AND SIX-POINT SEAT BELT SYSTEMS

BACKGROUND

Seat belts may enhance occupant protection in a vehicle. For example, in impact events and vehicle rollovers, seat belts can function to reduce secondary impacts, to keep occupants correctly positioned for secondary restraint systems (e.g., airbags), and to assist in preventing occupants from being ejected from the vehicle.

Impact events and vehicle rollovers may result in occupants sliding out from underneath the seatbelt. For example, forces from an impact can propel the occupant under the seatbelt, a phenomena sometimes referred to as submarining. When submarining occurs, safety benefits that may otherwise be provided by seat belts can be lost.

DETAILED DESCRIPTION

Figure 1:
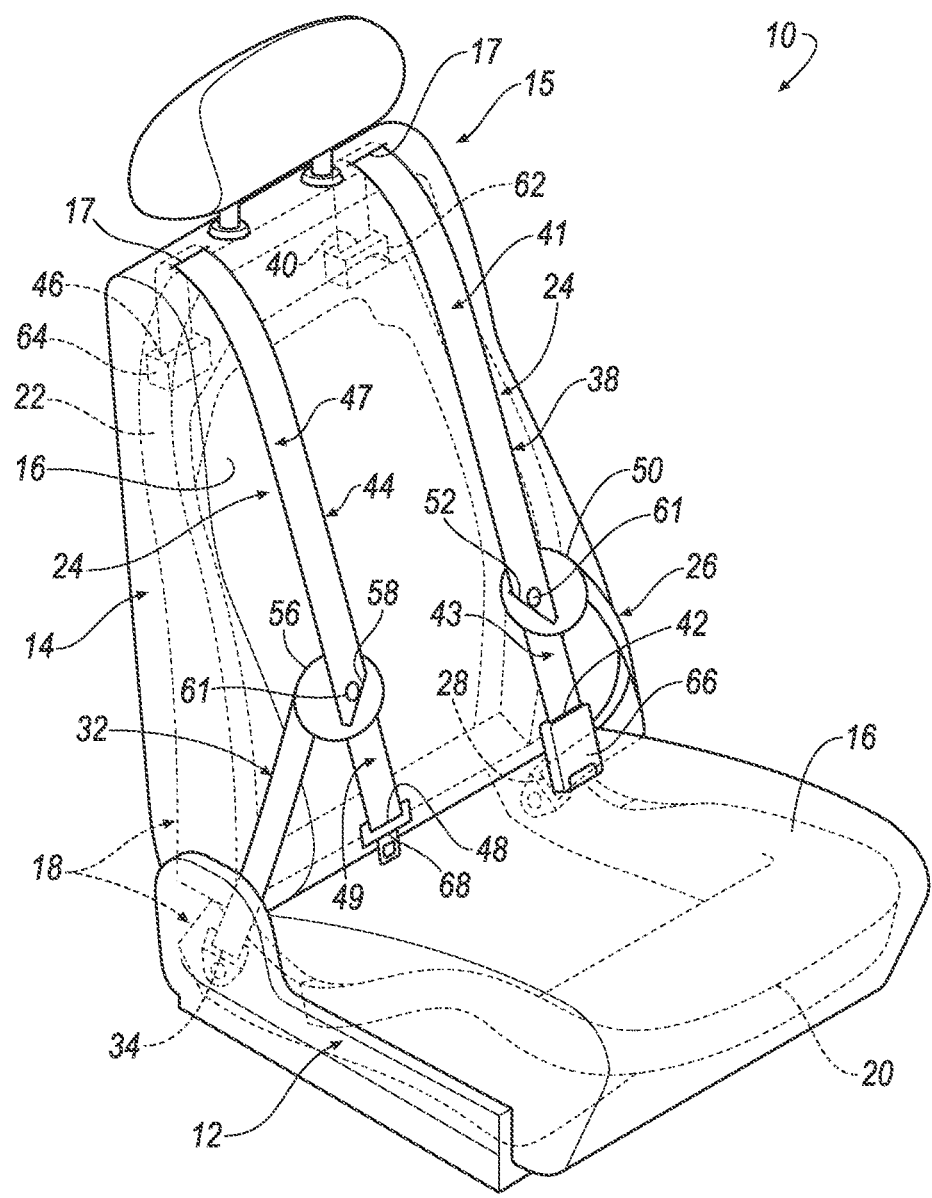
FIG. 1 is a perspective view of a vehicle seat, with a seat frame of the vehicle seat shown in hidden line, and an example of a seat belt assembly.

With reference to the Figures, wherein like numerals indicate like parts throughout the several views, a vehicle seat 10 may include a seat bottom 12, a seat back 14, a cover 16, a seat frame 18, and a seat belt assembly 24. The seat belt assembly 24 has a first lap belt portion 26, a second lap belt portion 32, a first shoulder belt 38, and a second shoulder belt 44.

FIG. 1 illustrates an example of the seat belt assembly 24. In this example, the first and second lap belt portions 26, 32 include anchored ends 28, 34. The anchored ends 28, 34 are fixedly attached to the seat frame 18 of the vehicle seat 10.

For example, the anchored end 28 of the first lap belt portion 26 can be fixedly attached to one side of a seat bottom frame 20 of the seat frame 18 of the vehicle seat 10. The anchored end 34 of the second lap belt portion 32 can be fixedly attached to an opposite side of the seat bottom frame 20. Alternatively, the anchored ends 28, 34 of the first and the second lap belt portions 26, 32 can be fixed to opposites sides of a seat back frame 22 of the seat frame 18. The anchored ends 28, 34 can be fixedly attached to the seat frame 18 in any suitable manner, e.g., using fasteners.

The seat frame 18, including the seat bottom frame 20 and the seat back frame 22, can be formed of metal, e.g., steel, aluminum, etc., as well as other suitable materials, including plastic and/or composite materials. The seat frame 18 may also be formed from a combination of materials.

Figure 2:
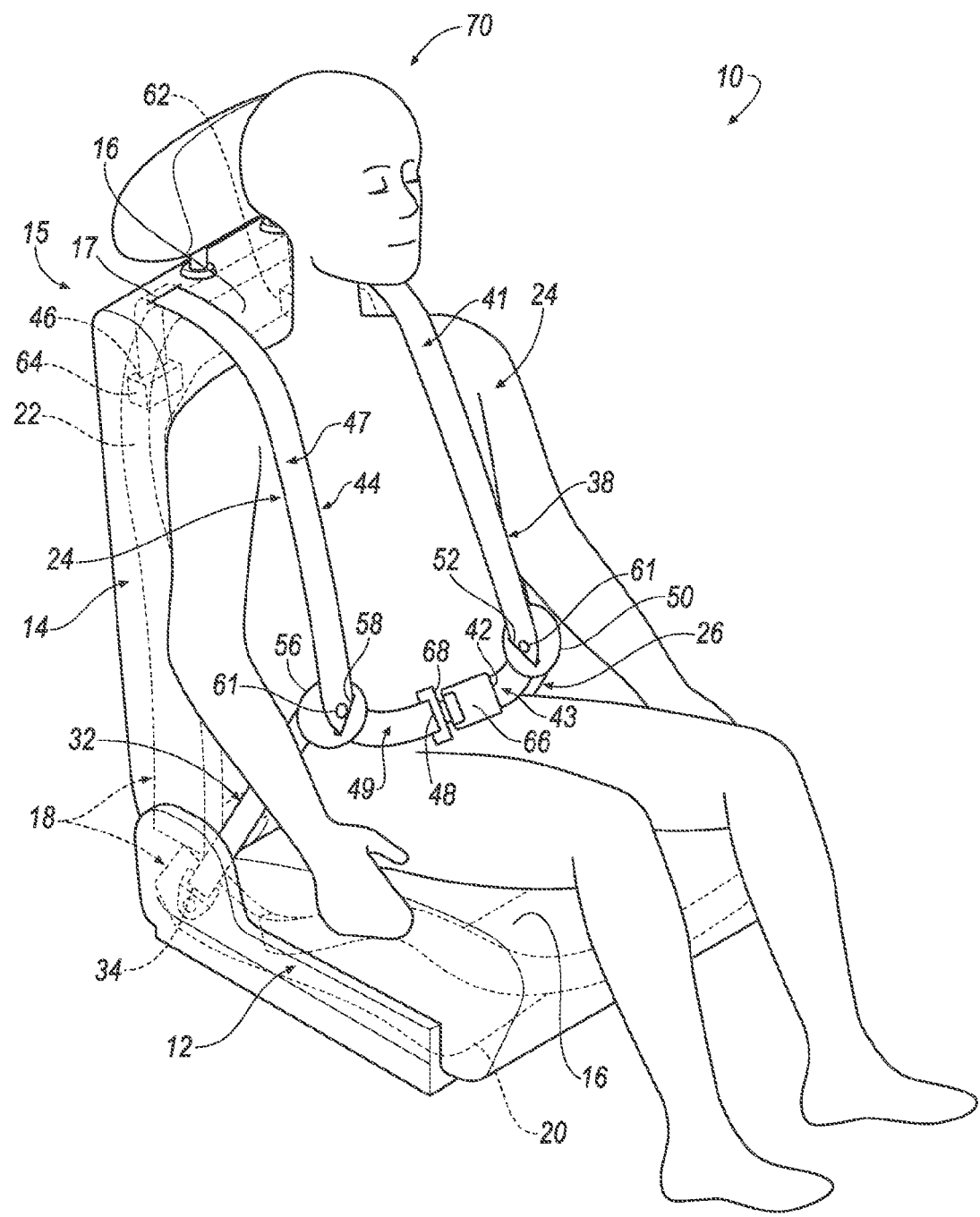
FIG. 2 is the same view of the vehicle seat, seat frame, and the seat belt assembly shown in FIG. 1, with the seat belt assembly fastened about a lap area of an occupant.
Figure 3:
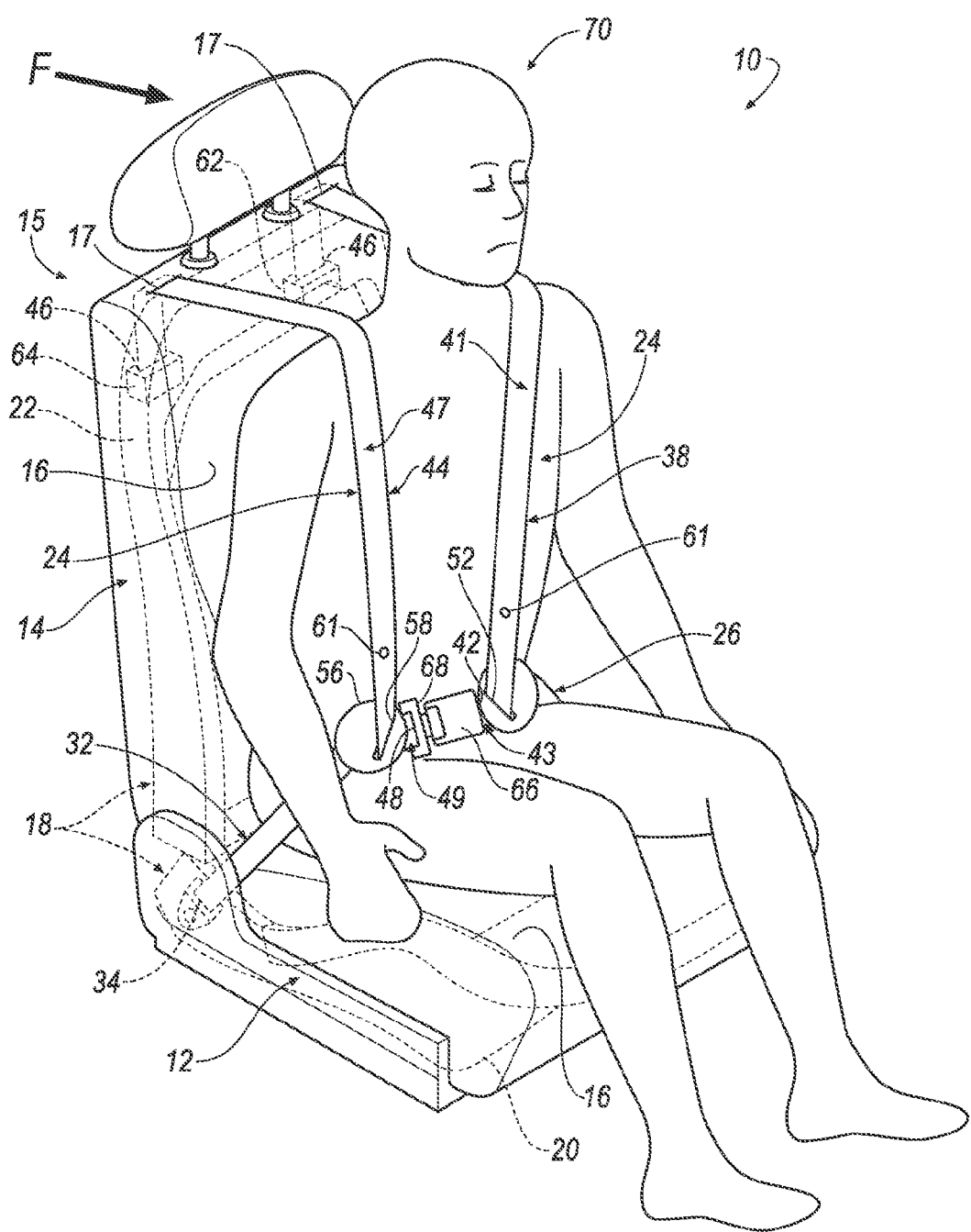
FIG. 3 is the same view of the vehicle seat, seat frame, seat belt assembly and the occupant shown in FIG. 2, with the occupant exerting a vehicle-forward force against upper portions of a first and a second shoulder belt.

Referring to FIGS. 1-3, the first lap belt portion 26 is fixedly attached to a first plate 50. The second lap belt portion 32 is fixedly attached to a second plate 56. The first and second plates 50, 56 include first slots 52, 58, respectively. The first and second plates 50, 56 may be constructed from metal, e.g., steel, aluminum, etc., as well as other suitable materials, including plastic and/or composite materials.

The first shoulder belt 38 has a retractor end 40 and a buckle end 42, and is slidably received in the first slot 52 of the first plate 50 between the retractor end 40 and the buckle end 42. The first shoulder belt 38 includes an upper portion 41 extending from the retractor end 40 to the first plate 50. The upper portion 41 of the first shoulder belt 38 may include a stop 61 proximate the first plate 50.

The stop 61 on the upper portion 41 of the first shoulder belt 38 is configured to prevent the upper portion 41 from sliding though the first slot 52 of the first plate 50 past the stop 61. In other words, the stop 61 may be of a size and/or shape such that the stop 61 does not fit through the first slot 52 of the first plate 50. The stop 61 can be constructed from any suitable material.

In addition to the upper portion 41, the first shoulder belt 38 can also include a lower portion 43. The lower portion 43 extends from the first plate 50 to the buckle end 42, as shown in FIGS. 1-3. The buckle end 42 of the lower portion 43 of the first shoulder belt 38 may be fixedly attached to a buckle 66.

The second shoulder belt 44 has a retractor end 46 and a tongue end 48. The second shoulder belt 44 is slidably received in the first slot 58 of the second plate 56 between the retractor end 46 and the tongue end 48. The second shoulder belt 44 includes an upper portion 47 extending from the retractor end 46 to the second plate 56. The upper portion 47 of the second shoulder belt 44 may also include a stop 61 proximate the second plate 56.

The stop 61 on the upper portion 47 of the second shoulder belt 44 is configured to prevent the upper portion 47 from sliding though the first slot 58 of the second plate 56 past the stop 61. In other words, the stop 61 may be of a size and/or shape such that the stop 61 does not fit through the first slot 58 of the second plate 56. The stop 61 can be constructed from any suitable material.

In addition to the upper portion 47, as shown in FIGS. 1-3, the second shoulder belt 44 can also include a lower portion 49 extending from the second plate 56 to the tongue end 48. The tongue end 48 of the second shoulder belt 44 may be fixedly attached to a tongue 68.

The buckle 66 and the tongue 68 are releasably attachable to each other, e.g., around a lap area of an occupant 70, as shown in FIG. 2.

The retractor ends 40, 46 of the first and the second shoulder belts 38, 44 can be rotatably mounted to retractors 62, 64. The retractors 62, 64 may be fixedly attached to the seat frame 18 of the vehicle seat 10.

For example, a top portion 15 of a seat back 14 of the vehicle seat 10 can include openings 17 in the cover 16 through which the upper portions 41, 47 of the first and the second shoulder belts 38, 44 extend. The retractors 62, 64 to which the retractor ends 40, 46 of the first and the second shoulder belts 38, 44 are rotatably mounted can be fixedly attached to a seat back frame 22 of the seat frame 18 in any suitable manner, e.g., using fasteners.

The retractors 62, 64 can stop the first and/or second shoulder belts 38, 44 from extending, or paying out, e.g., during an impact event.

As shown in FIG. 3, if a torso of the occupant 70 applies a vehicle-forward force F to the upper portions 41, 47 of the first and the second shoulder belts 38, 44, a length of the upper portions 41, 47 of the first and the second shoulder belts 38, 44 will increase, while a length of the lower portions 43, 49 of the first and the second shoulder belts 38, 44 can decrease. As such, an overall length of the first lap belt portion 26, the lower portion 43 of the first shoulder belt 38, the lower portion 49 of the second shoulder belt 44, and the second lap belt portion 32, can decrease. In this way, the example of the seat belt assembly shown in FIGS. 1-3 can pull the lap area of the occupant 70 toward the vehicle seat 10.

Figure 4:
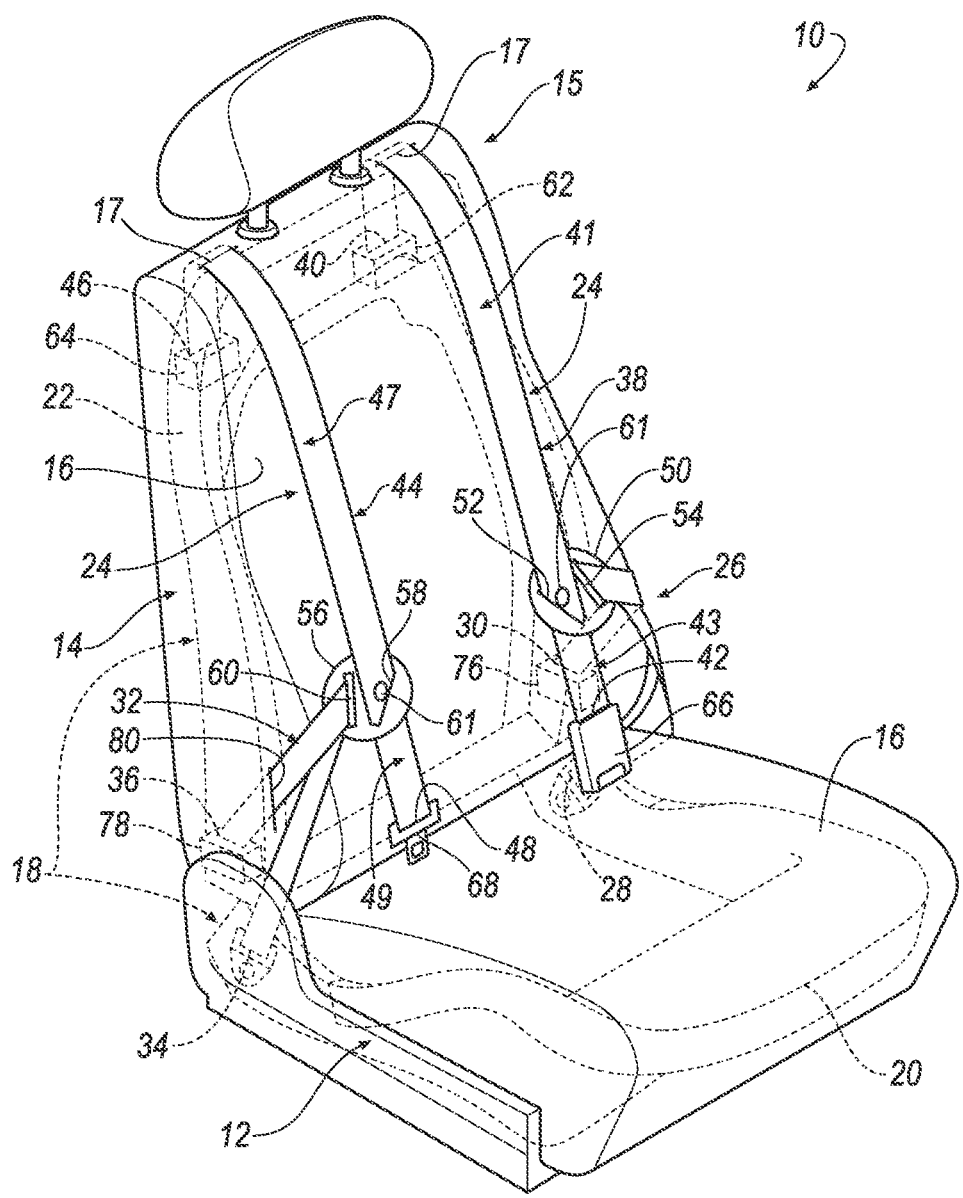
FIG. 4 is a perspective view of a vehicle seat, with a seat frame of the vehicle seat shown in hidden line, and an example of a seat belt assembly.
Figure 5:
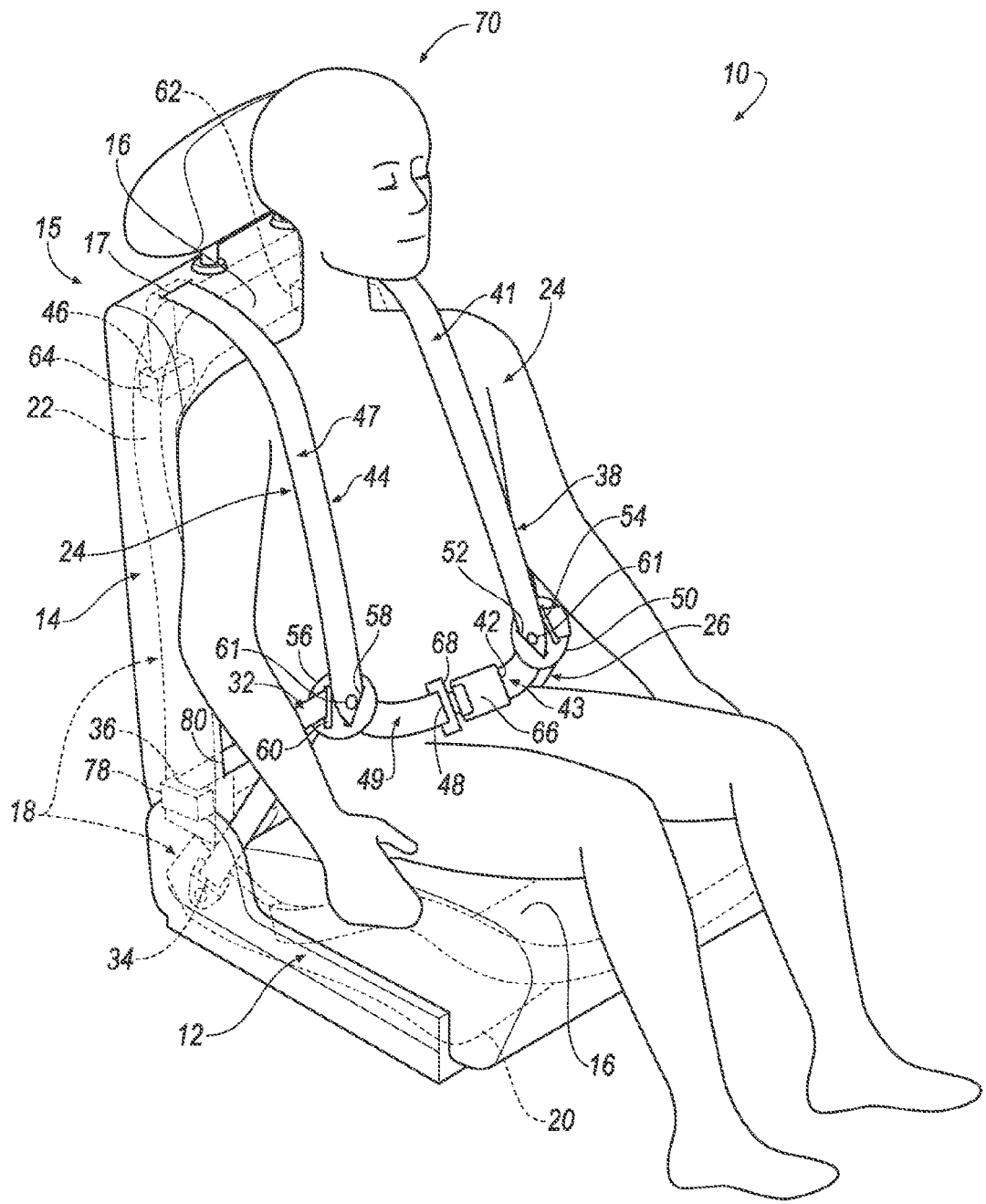
FIG. 5 is the same view of the vehicle seat, seat frame, and the seat belt assembly shown in FIG. 4, with the seat belt assembly fastened about a lap area of an occupant.
Figure 6:
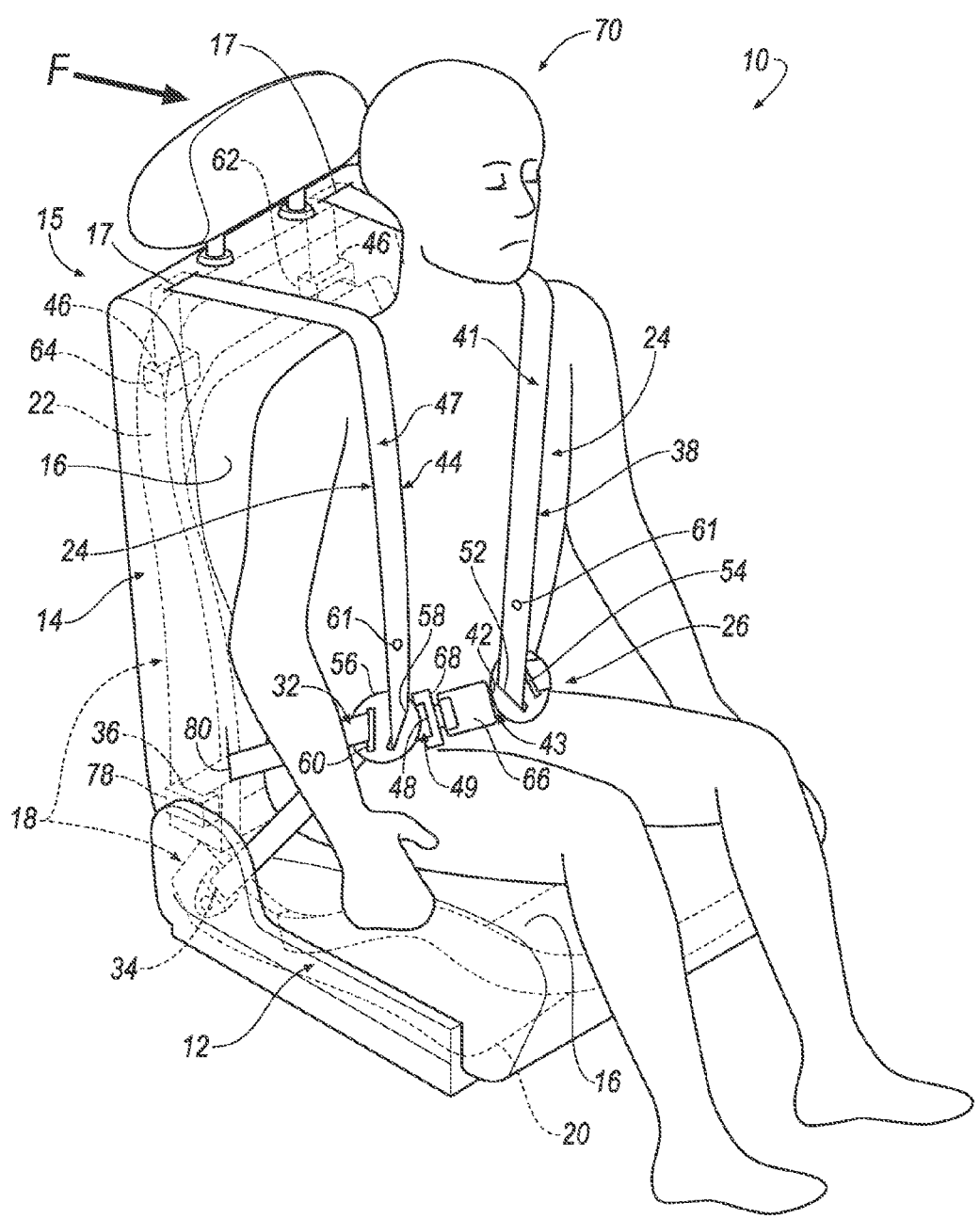
FIG. 6 is the same view of the vehicle seat, seat frame, seat belt assembly and the occupant shown in FIG. 5, with the occupant exerting a vehicle-forward force against upper portions of a first and a second shoulder belt.

FIGS. 4-6 illustrate another example of the seat belt assembly 24. In this example, the first and second lap belt portions 26, 32 include anchored ends 28, 34 and second ends 30, 36. The first lap belt portion 26 is slidably received in a second slot 54 of the first plate 50 between the anchored end 28 and the second end 30. The second lap belt portion 32 is slidably received in a second slot 60 of the second plate 56 between the anchored end 34 and the second end 36.

The first and the second slots 52, 54 of the first plate 50 are in a non-parallel arrangement relative to each other, as are the first and second slots 58, 60 of the second plate 56. For example, the second slots 54, 60 of the first and second plates 50, 56 extend in a substantially vertical direction. The first slots 52, 58 extend at an angle relative to the second slots 54, 60.

Referring back to the first and the second lap belt portions 26, 32 shown in FIGS. 4-6, the anchored ends 28, 34 are fixedly attached to the seat frame 18 of the vehicle seat 10. For example, the anchored end 28 of the first lap belt portion 26 can be fixedly attached to one side of a seat bottom frame 20 of the seat frame 18 of the vehicle seat 10. The anchored end 34 of the second lap belt portion 32 can be fixedly attached to an opposite side of the seat bottom frame 20. Alternatively, the anchored ends 28, 34 of the first and the second lap belt portions 26, 32 can be fixedly attached to opposites sides of a seat back frame 22 of the seat frame 18. The anchored ends 28, 34 can be fixedly attached to the seat frame 18 in any suitable manner, e.g., using fasteners.

The second ends 30, 36 of the first and the second lap belt portions 26, 32 can be rotatably mounted to retractors 76, 78. The retractors 76, 78 may be fixedly attached to the seat frame 18 of the vehicle seat 10. The retractors 76, 78 can stop the first and/or second lap belt portions 26, 32 from extending, or paying out, e.g., during an impact event.

For example, the vehicle seat 10 can include openings 80 in the cover 16 through which the second ends 30, 36 of the first and the second lap belt portions 26, 32 extend. The retractors 76, 78 to which the second ends 30, 36 of the first and the second lap belt portions 26, 32 are rotatably mounted can be fixedly attached to the seat frame 18 in any suitable manner, e.g., using fasteners. If the anchored ends 28, 34 of the first and second lap belt portions 26, 32 are fixedly attached to seat bottom frame 20, then the retractors 76, 78 may be fixedly attached to the seat back frame 22. Alternatively, if the anchored ends 28, 34 of the first and second lap belt portions 26, 32 are fixedly attached to seat back frame 22, then the retractors 76, 78 may be fixedly attached to the seat bottom frame 20. The retractors 76, 78 can stop the first and/or second lap belt portions 26, 32 from extending, or paying out, e.g., during an impact event.

With continued reference to FIGS. 4-6, the first shoulder belt 38 has the retractor end 40 and the buckle end 42, and is slidably received in the first slot 52 of the first plate 50 between the retractor end 40 and the buckle end 42. The first shoulder belt 38 includes the upper portion 41 extending from the retractor end 40 to the first plate 50. The upper portion 41 of the first shoulder belt 38 may include the stop 61 proximate the first plate 50.

The stop 61 is configured to prevent the upper portion 41 of the first shoulder belt 38 from sliding though the first slot 52 of the first plate 50 past the stop 61. In other words, the stop 61 may be of a size and/or shape such that the stop 61 does not fit through the first slot 52 of the first plate 50. The stop 61 can be constructed from any suitable material.

In addition to the upper portion 41, the first shoulder belt can also include the lower portion 43. The lower portion 43 extends from the first plate 50 to the buckle end 42, as shown in FIGS. 4-6. The buckle end 42 of the lower portion 43 of the first shoulder belt may be fixedly attached to the buckle 66.

The second shoulder belt 44 has a retractor end 46 and the tongue end 48. The second shoulder belt 44 is slidably received in the first slot 58 of the second plate 56 between the retractor end 46 and the tongue end 48. The second shoulder belt 44 includes the upper portion 47 extending from the retractor end 46 to the second plate 56. The upper portion 47 of the second shoulder belt 44 may also include a stop 61 proximate the second plate 56.

The stop 61 on the upper portion 47 of the second shoulder belt 44 is configured to prevent the upper portion 47 from sliding though the first slot 58 of the second plate 56 past the stop 61. In other words, the stop 61 may be of a size and/or shape such that the stop 61 does not fit through the first slot 58 of the second plate 56. The stop 61 can be constructed from any suitable material.

In addition to the upper portion 47, as shown in FIGS. 4-6, the second shoulder belt 44 can also include a lower portion 49 extending from the second plate 56 to the tongue end 48. The tongue end 48 of the second shoulder belt 44 may be fixedly attached to the tongue 68.

The buckle 66 and the tongue 68 are releasably attachable to each other, e.g., around the lap area of the occupant 70, as shown in FIG. 5.

The retractor ends 40, 46 of the first and the second shoulder belts 38, 44 can be rotatably mounted to retractors 62, 64. The retractors 62, 64 may be fixedly attached to the seat frame 18 of the vehicle seat 10.

For example, the top portion 15 of the seat back 14 of the vehicle seat 10 can include the openings 17 in the cover 16 through which the upper portions 41, 47 of the first and the second shoulder belts 38, 44 extend. The retractors 62, 64 to which the retractor ends 40, 46 of the first and the second shoulder belts 38, 44 are rotatably mounted can be fixedly attached to the seat back frame 22 of the seat frame 18 in any suitable manner, e.g., using fasteners.

The retractors 62, 64 can stop the first and/or second shoulder belts 38, 44 from extending, or paying out, e.g., during a frontal impact event.

As shown in FIG. 6, if the torso of the occupant 70 applies a vehicle-forward force F to the upper portions 41, 47 of the first and the second shoulder belts 38, 44, a length of the upper portions 41, 47 of the first and the second shoulder belts 38, 44 will increase, while a length of the lower portions 43, 49 of the first and the second shoulder belts 38, 44 can decrease. As such, an overall length of the first lap belt portion 26, the lower portion 43 of the first shoulder belt 38, the lower portion 49 of the second shoulder belt 44, and the second lap belt portion 32, can decrease. In this way, the example of the seat belt assembly shown in FIGS. 4-6 can pull the lap area of the occupant 70 toward the vehicle seat 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat belt assembly, comprising:
   a first lap belt portion having an anchored end and engaged with a first plate;
   a second lap belt portion having an anchored end and engaged with a second plate;
   a first shoulder belt having a retractor end and a buckle end, the first shoulder belt slidably received in a first slot in the first plate between the retractor end and the buckle end; and
   a second shoulder belt having a retractor end and a tongue end, the second shoulder belt slidably received in a first slot in the second plate between the retractor end and the tongue end.

2. The seat belt assembly of claim 1, further comprising a vehicle seat having a seat frame, including a seat bottom frame and a seat back frame.

3. The seat belt assembly of claim 2, wherein the first lap belt portion is slidably received in a second slot in the first plate between a second end and the anchored end of the first lap belt portion, and the second lap belt portion is slidably received in a second slot in the second plate between a second end and the anchored end of the second lap belt portion.

4. The seat belt assembly of claim 3, wherein the anchored ends of the first and the second lap belt portions are fixedly attached to one of the seat bottom frame and the seat back frame, and the second ends of the first and the second lap belt portions are fixedly attached to the other one of the seat bottom frame and the seat back frame.

5. The seat belt assembly of claim 3, wherein the anchored ends of the first and the second lap belt portions are fixedly attached to one of the seat bottom frame and the seat back frame, and the second ends of the first and the second lap belt portions are rotatably mounted to retractors fixedly attached to the other one of the seat bottom frame and the seat back frame.

6. The seat belt assembly of claim 3, wherein the first slot and the second slot of the first plate and the second plate are in a non-parallel arrangement relative to each other.

7. The seat belt assembly of claim 2, wherein the first and the second shoulder belts extend through openings in a top portion of a seat back of the vehicle seat.

8. The seat belt assembly of claim 7, wherein the retractor ends of the first and the second shoulder belts are rotatably mounted to retractors fixedly attached to the seat frame.

9. The seat belt assembly of claim 2, wherein the anchored ends of the first and the second lap belt portions are fixed to the seat frame.

10. The seat belt assembly of claim 9, wherein the anchored ends of the first and the second lap belt portions are fixed to the seat bottom frame.

11. The seat belt assembly of claim 1, wherein the first lap belt portion is fixedly attached to the first plate, and the second lap belt portion is fixedly attached to the second plate.

12. The seat belt assembly of claim 1, wherein the first lap belt portion is slidably received in a second slot in the first plate between a second end and the anchored end of the first lap belt portion, and the second lap belt portion is slidably received in a second slot in the second plate between a second end and the anchored end of the second lap belt portion.

13. The seat belt assembly of claim 1, further comprising a stop on a webbing of the first shoulder belt between the retractor end and the first plate.

14. The seat belt assembly of claim 13, wherein a length between the stop and the buckle end of the first shoulder belt is substantially 3 inches.

15. A vehicle seat, comprising:
    a frame including a seat bottom frame and a seat back frame;
    a first lap belt portion having an anchored end and engaged with a first plate;
    a second lap belt portion having an anchored end and engaged with a second plate;
    a first shoulder belt having a retractor end and a buckle end, the first shoulder belt slidably received in a first slot in the first plate between the retractor end and the buckle end; and
    a second shoulder belt having a retractor end and a tongue end, the second shoulder belt slidably received in a first slot in the second plate between the retractor end and the tongue end.

16. The vehicle seat of claim 15, wherein the anchored ends of the first and second lap belt portions are fixedly attached to the frame.

17. The vehicle seat of claim 15, wherein the anchored ends of the first and second lap belt portions are fixedly attached to the seat bottom frame.

18. The vehicle seat of claim 15, wherein the first lap belt portion is fixedly attached to the first plate, and a the second lap belt portion is fixedly attached to the second plate.

19. The vehicle seat of claim 15, wherein the first lap belt portion is slidably received in a second slot in the first plate between a second end and the anchored end of the first lap belt portion, and the second lap belt portion is slidably received in a second slot in the second plate between a second end and the anchored end of the second lap belt portion.

20. The vehicle seat of claim 19, wherein the anchored ends of the first and the second lap belt portions are fixedly attached to one of the seat bottom frame and the seat back frame, and the second ends of the first and the second lap belt portions are fixedly attached to the other one of the seat bottom frame and the seat back frame.

* * * * *

UNITED STATES PATENT AND TRADEMARK OFFICE
CERTIFICATE OF CORRECTION

PATENT NO. : 9,884,608 B1
APPLICATION NO. : 15/215163
DATED : February 6, 2018
INVENTOR(S) : Ray S. Roychoudhury It is certified that error appears in the above-identified patent and that said Letters Patent is hereby corrected as shown below:

In the Claims

Column 6, in Line 44, replace "and a the second" with -- and the second --.

Signed and Sealed this
Twenty-fourth Day of April, 2018

Andrei Iancu
*Director of the United States Patent and Trademark Office*